(12) United States Patent
Yoshida et al.

(10) Patent No.: US 9,476,397 B2
(45) Date of Patent: Oct. 25, 2016

(54) GLOWPLUG CONTROL DEVICE AND METHOD FOR ESTIMATING TEMPERATURE OF GLOWPLUG

(71) Applicant: Mazda Motor Corporation, Aki-gun, Hiroshima (JP)

(72) Inventors: Motonori Yoshida, Hiroshima (JP); Shingo Harada, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 156 days.

(21) Appl. No.: 14/462,497

(22) Filed: Aug. 18, 2014

(65) Prior Publication Data

US 2015/0059680 A1    Mar. 5, 2015

(30) Foreign Application Priority Data

Aug. 29, 2013   (JP) ................. 2013-178073

(51) Int. Cl.
  *F02B 3/00* (2006.01)
  *F02P 19/02* (2006.01)
  *F02P 5/15* (2006.01)
  (Continued)

(52) U.S. Cl.
  CPC .............. *F02P 19/025* (2013.01); *F02D 9/04* (2013.01); *F02P 5/1502* (2013.01); *F02P 19/021* (2013.01); *F02P 19/026* (2013.01); *F02D 41/006* (2013.01); *F02D 41/0065* (2013.01); *F02D 41/402* (2013.01); *F02M 26/01* (2016.02); *F02M 26/08* (2016.02); *F02M 26/10* (2016.02); *F02M 26/28* (2016.02); *Y02T 10/46* (2013.01)

(58) Field of Classification Search
  CPC ........ F02P 19/025; F02P 9/04; F02P 19/026; F02P 5/1502; F02P 19/021; Y02T 10/46; F02D 41/0065; F02D 41/006; F02D 41/402

USPC .......................................... 123/179.21, 179.6
See application file for complete search history.

(56) References Cited

U.S. PATENT DOCUMENTS

2008/0163840 A1* 7/2008 Toedter ................ F02P 19/026
                                                           123/145 A
2009/0008378 A1* 1/2009 Kernwein ............ F02P 19/021
                                                           219/260

(Continued)

FOREIGN PATENT DOCUMENTS

JP        2009047134 A  *  3/2009
JP        2009250182 A     10/2009

*Primary Examiner* — Joseph Dallo
(74) *Attorney, Agent, or Firm* — Alleman Hall McCoy Russell & Tuttle LLP

(57) ABSTRACT

A glowplug control device for controlling an applied voltage or power for a glowplug is provided, which includes a target calculating module for calculating a target applied voltage or power to adjust a glowplug temperature to a predetermined target temperature, an output module for applying the target applied voltage or power to the glowplug when the target applied voltage or power is below a maximum applicable voltage or power, and applying the maximum applicable voltage or power to the glowplug when the target applied voltage or power is above the maximum applicable voltage or power, and a temperature estimating module for estimating the glowplug temperature to be the target temperature when the target applied voltage or power is applied to the glowplug, and estimating the glowplug temperature to be below the target temperature by a temperature decrease amount when the maximum applicable voltage or power is applied to the glowplug.

6 Claims, 6 Drawing Sheets

(51) Int. Cl.
*F02D 9/04* (2006.01)
*F02D 41/00* (2006.01)
*F02D 41/40* (2006.01)

(56) References Cited

U.S. PATENT DOCUMENTS

2009/0316328 A1* 12/2009 Kernwein ............. F02P 19/025
                                                    361/264

2010/0280735 A1* 11/2010 Moritz ................. F02D 41/126
                                                    701/102
2011/0000901 A1* 1/2011 Bauer .................... F02P 19/025
                                                    219/494
2011/0118964 A1* 5/2011 Tanaka ................. F02P 19/021
                                                    701/113
2011/0246045 A1* 10/2011 Cassani ................ F02N 19/02
                                                    701/102
2011/0303649 A1* 12/2011 Sakurai ............... F02D 41/2432
                                                    219/263

* cited by examiner

GLOWPLUG CONTROL DEVICE AND METHOD FOR ESTIMATING TEMPERATURE OF GLOWPLUG

BACKGROUND

The present invention relates to a glowplug control device and a method of estimating a temperature of a glowplug.

Conventionally, a prior art in which a glowplug is provided in an engine to improve ignitability and combustibility is known. For example, JP2009-250182A discloses a feedback control of an amount of power supplied to a glowplug to adjust a temperature of the glowplug to a target temperature.

Meanwhile, it is preferred that a glowplug is accurately controlled not only in applied voltage or applied power, but also in temperature. For example, to calculate a remaining life of a glowplug, the temperature of the glowplug is required. If the temperature of the glowplug can be obtained accurately, the remaining life of the glowplug can be estimated accurately.

SUMMARY

The present invention is made in view of the above situations and aims to obtain a temperature of a glowplug accurately.

According to one aspect to the present invention, a glowplug control device for controlling one of an applied voltage and an applied power for a glowplug is provided. The device includes a target calculating module for calculating one of a target applied voltage and a target applied power for the glowplug, so as to adjust a temperature of the glowplug to a predetermined target temperature. The device also includes an output module for applying the one of the target applied voltage and the target applied power to the glowplug when the one of the target applied voltage and the target applied power is lower than one of a maximum applicable voltage and a maximum applicable power, and applying the one of the maximum applicable voltage and the maximum applicable power to the glowplug when the one of the target applied voltage and the target applied power is higher than the one of the maximum applicable voltage and the maximum applicable power, the maximum applicable voltage being an upper limit for applying a voltage to the glowplug, the maximum applicable power being an upper limit for applying a power to the glowplug. The device also includes a temperature estimating module for estimating that the temperature of the glowplug is at the target temperature when the one of the target applied voltage and the target applied power is applied to the glowplug, and estimating that the temperature of the glowplug is lower than the target temperature by a temperature decrease amount that is based on either one of a difference between the target applied voltage and the maximum applicable voltage and a difference between the target applied power and the maximum applicable power when the one of the maximum applicable voltage and the maximum applicable power is applied to the glowplug.

According to the above configuration, one of the target applied voltage and the target applied power for adjusting the temperature of the glowplug to the predetermined target temperature is calculated. However, the glowplug has one of the maximum applicable voltage and the maximum applicable power. When the one of the target applied voltage and the target applied power is lower than the one of the maximum applicable voltage and the maximum applicable power, the one of the target applied voltage and the target applied power is applied to the glowplug. In this case, the temperature of the glowplug is estimated to be at the target temperature. On the other hand, when the one of the target applied voltage and the target applied power is higher than the one of the maximum applicable voltage and the maximum applicable power, the one of the target applied voltage and the target applied power cannot be applied to the glowplug. In this case, the glowplug cannot be controlled to the target temperature. Thus, the temperature decrease amount is calculated based on either one of the difference between the target applied voltage and the maximum applicable voltage and the difference between the target applied power and the maximum applicable power, and the temperature of the glowplug is estimated. Thus, the temperature of the glowplug can be calculated accurately.

Moreover, the glowplug control device may also include a memory for storing one of a basic applied voltage and a basic applied power for the glowplug, so as to adjust the temperature of the glowplug to the predetermined target temperature in a predetermined reference operating state of an engine. The target calculating module may calculate the one of the target applied voltage and the target applied power by correcting the one of the basic applied voltage and the basic applied power according to a difference between an actual operating state of the engine and the reference operating state.

According to the above configuration, the memory stores one of the basic applied voltage and the basic applied power in the reference operating state. Further, when the actual engine operating state is different from the reference operating state, the target calculating module corrects the one of the basic applied voltage and the basic applied power according to the difference between the actual operating state of the engine and the reference operating state and calculates the one of the target applied voltage and the target applied power. In this manner, it is not required to store the one of the target applied voltage and the target applied power according to various operating states of the engine, and thus, the amount of data to be stored in the memory can be reduced.

Further, in the reference operating state, a fuel may be set to be split and injected in a predetermined number of injection stages. The target calculating module may correct the one of the basic applied voltage and the basic applied power so that the one of the target applied voltage and the target applied power becomes higher as an actual number of fuel injection stages becomes less than the predetermined number of injection stages. When an interval between one fuel injection and a subsequent fuel injection is shorter than a predetermined interval or when a fuel injection amount in one of two consecutive fuel injections is smaller than a predetermined amount, the target calculating module may correct the one of the basic applied voltage and the basic applied power while considering the two fuel injections as a single-stage injection.

According to the above configuration, the engine operating state in which the fuel is split and injected in the predetermined number of injection stages is set to be the reference operating state. Further, in the case where the actual number of injection stages is different from the predetermined number of injection stages, accordingly, the one of the basic applied voltage and the basic applied power is corrected. Here, when the number of injection stages becomes less, the fuel injection amount in a single injection becomes larger, and as a result, the temperature of the glowplug decreases more. Therefore, the one of the basic applied voltage and the basic applied power is corrected so that the one of the target applied voltage and the target applied power becomes higher as the actual number of injection stages becomes less than the predetermined number of injection stages. Note that when the interval between the fuel injection and the subsequent fuel injection is short, the temperature of the glowplug may decrease as much as the case where the fuel for two injections is injected at once. Moreover, when the injection amount is small, the influence of the injection on the temperature decrease of the glowplug is small. Therefore, when the interval between the fuel injection and the subsequent fuel injection is short, the one of the basic applied voltage and the basic applied power is corrected while considering the two fuel injections as a single-stage injection. Thus, the temperature decrease of the glowplug can be estimated accurately.

Moreover, in the reference operating state, a fuel may be set to be split and injected in a predetermined number of injection stages. The target calculating module may correct the one of the basic applied voltage and the basic applied power so that the one of the target applied voltage and the target applied power becomes higher as an actual number of fuel injection stages becomes less than the predetermined number of injection stages. When an interval between one fuel injection and a subsequent fuel injection is shorter than a predetermined interval, the target calculating module may correct the one of the basic applied voltage and the basic applied power to a value between the one of the target applied voltage and the target applied power when the two fuel injections are considered as a single-stage injection and the one of the target applied voltage and the target applied power when the two fuel injections are considered as two-stage injections.

According to the above configuration, the engine operating state in which the fuel is split and injected in the predetermined number of injection stages is set to be the reference operating state. Further, the one of the basic applied voltage and the basic applied power is corrected so that the one of the target applied voltage and the target applied power becomes higher as the actual number of injection stages becomes less than the predetermined number of injection stages. Note that when the interval between the fuel injection and the subsequent fuel injection is short, the temperature decrease of the glowplug may be larger than the case where the injection interval is long. Therefore, when the interval between the fuel injection and the subsequent fuel injection is shorter than the predetermined interval, the one of the basic applied voltage and the basic applied power is corrected to the value between the one of the target applied voltage and the target applied power when the two fuel injections are considered as a single-stage injection and the one of the target applied voltage and the target applied power when the two fuel injections are considered as two-stage injections. Thus, the temperature decrease of the glowplug can be estimated accurately.

Moreover, the glowplug control device may also include a remaining life estimating module for calculating a wear amount of the glowplug based on the estimated temperature of the glowplug and an operating period of time of the glowplug, and estimating a remaining life of the glowplug by integrating the wear amounts.

According to the above configuration, the remaining life of the glowplug is calculated based on the temperature of the glowplug. In other words, by accurately estimating the temperature of the glowplug as described above, the remaining life of the glowplug can be estimated accurately.

According to another aspect to the present invention, a method of estimating a temperature of a glowplug is provided. The method includes calculating one of a target applied voltage and a target applied power for the glowplug, so as to adjust the temperature of the glowplug to a predetermined target temperature. The method also includes applying the one of the target applied voltage and the target applied power to the glowplug when the one of the target applied voltage and the target applied power is lower than one of a maximum applicable voltage and a maximum applicable power, and applying the one of the maximum applicable voltage and the maximum applicable power to the glowplug when the one of the target applied voltage and the target applied power is higher than the one of the maximum applicable voltage and the maximum applicable power, the maximum applicable voltage being an upper limit for applying a voltage to the glowplug, the maximum applicable power being an upper limit for applying a power to the glowplug. The method also includes estimating that the temperature of the glowplug is at the target temperature when the one of the target applied voltage and the target applied power is applied to the glowplug, and estimating that the temperature of the glowplug is lower than the target temperature by a temperature decrease amount that is based on either one of a difference between the target applied voltage and the maximum applicable voltage and a difference between the target applied power and the maximum applicable power when the one of the maximum applicable voltage and the maximum applicable power is applied to the glowplug.

According to the above configuration, one of the target applied voltage and the target applied power for adjusting the temperature of the glowplug to the predetermined target temperature is calculated. However, the glowplug has one of the maximum applicable voltage and the maximum applicable power. Therefore, when the one of the target applied voltage and the target applied power is lower than the one of the maximum applicable voltage and the maximum applicable power, the one of the target applied voltage and the target applied power is applied to the glowplug. In this case, the temperature of the glowplug is estimated to be at the target temperature. On the other hand, when the one of the target applied voltage and the target applied power is higher than the one of the maximum applicable voltage and the maximum applicable power, the one of the target applied voltage and the target applied power cannot be applied to the glowplug. In this case, the glowplug cannot be controlled to the target temperature. Thus, the temperature decrease amount is calculated based on either one of the difference between the target applied voltage and the maximum applicable voltage and the difference between the target applied power and the maximum applicable power, and the temperature of the glowplug is estimated. Thus, the temperature of the glowplug can be calculated accurately.

DETAILED DESCRIPTION OF EMBODIMENTS

Figure 1:
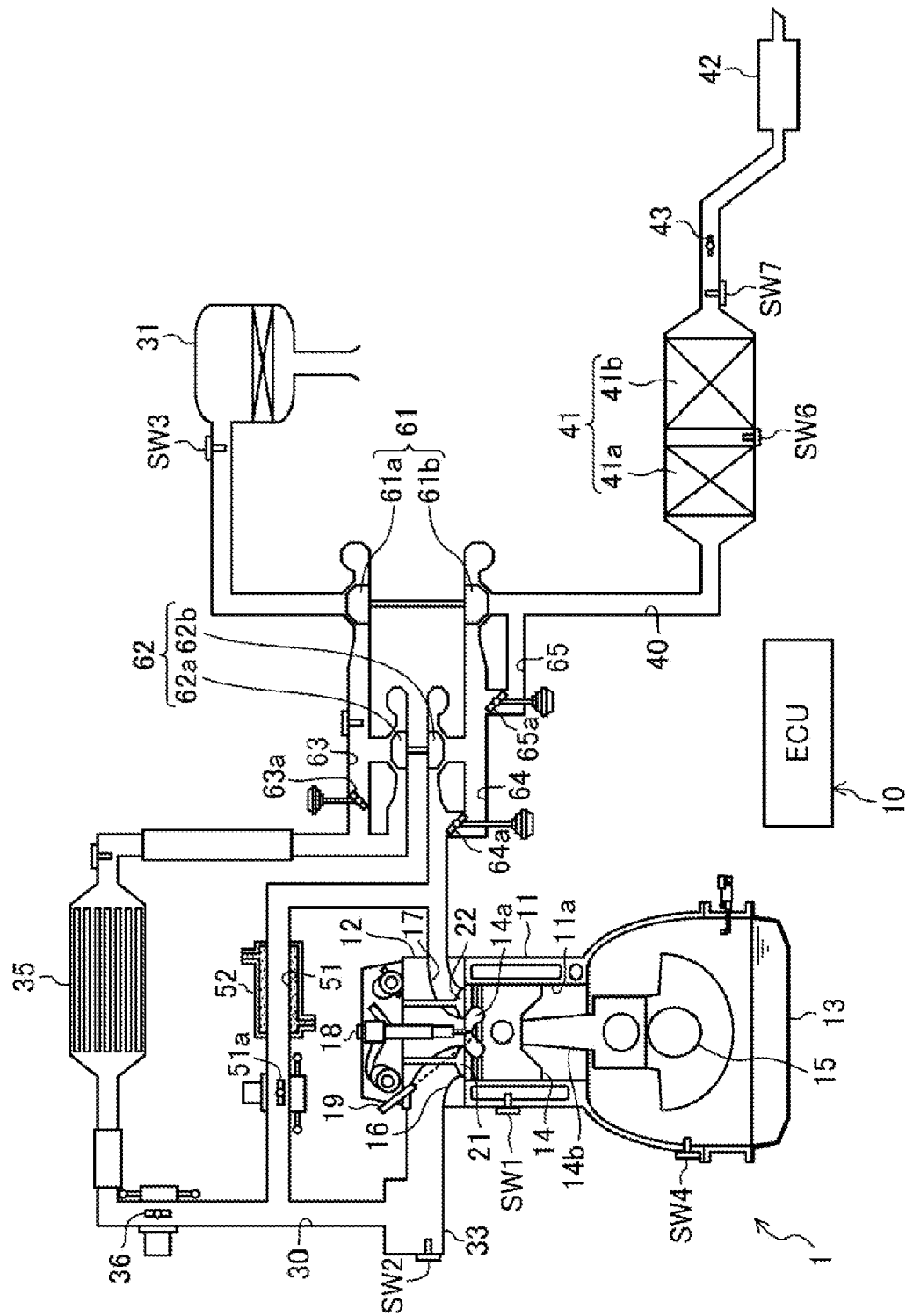
FIG. 1 is a schematic diagram illustrating a configuration of a diesel engine with turbochargers.
Figure 2:
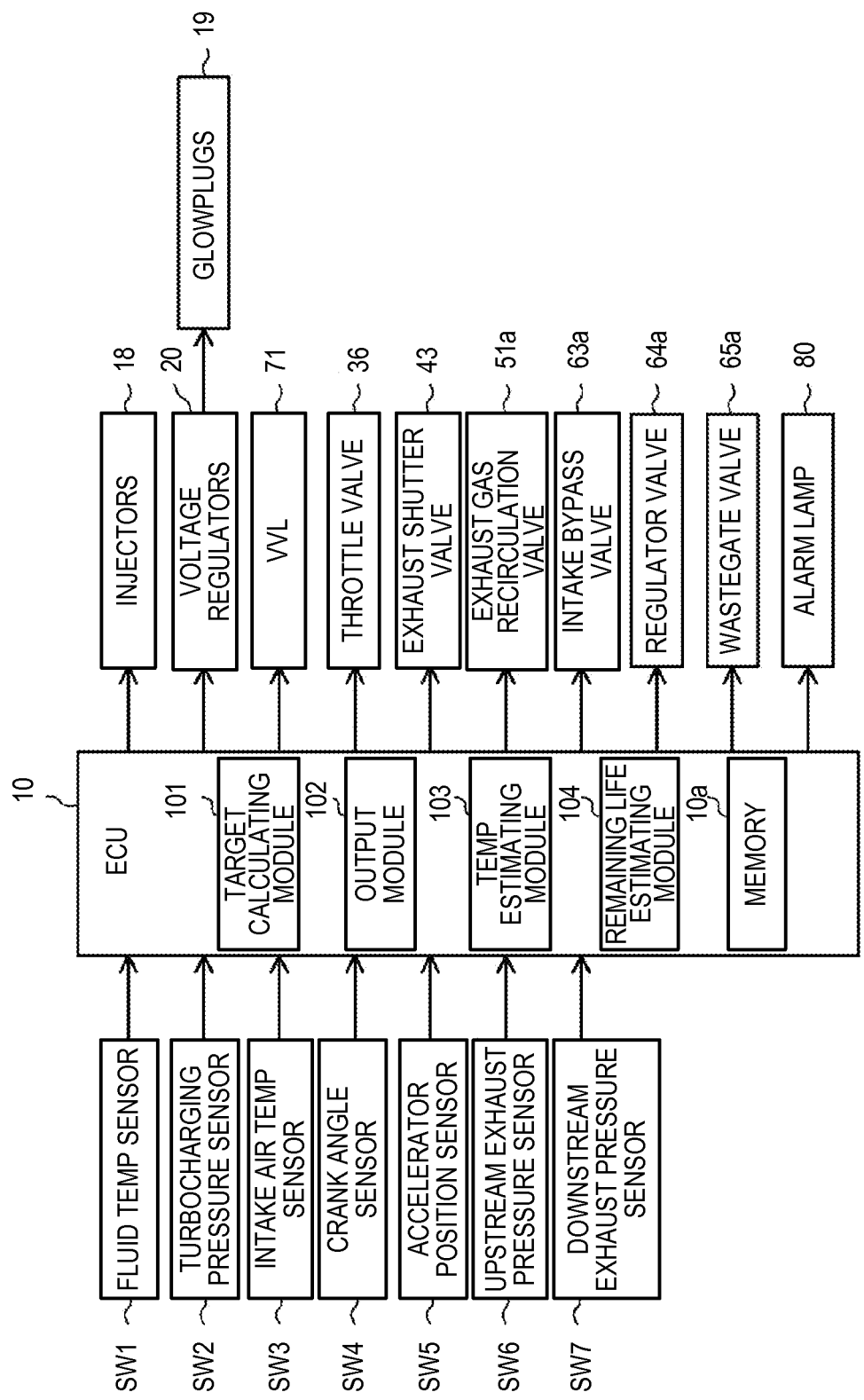
FIG. 2 is a block diagram relating to a control of the diesel engine.

Hereinafter, a diesel engine according to one embodiment of the present invention is described in detail with reference to the appended drawings. Note that the following description of the preferred embodiment is merely an illustration. FIGS. 1 and 2 illustrate a schematic configuration of an engine 1 of this embodiment. The engine 1 is a diesel engine installed in a vehicle and to which a fuel mainly containing a diesel fuel is supplied. The engine 1 includes a cylinder block 11 formed with a plurality of cylinders 11a (only one is illustrated in FIG. 1), a cylinder head 12 disposed on the cylinder block 11, and an oil pan 13 disposed below the cylinder block 11 and where a lubricant is stored. The engine 1 of this embodiment is also an in-line four-cylinder engine where the first to four cylinders 11a are disposed in line; however, it is not limited to such in-line four-cylinder engine. A piston 14 is reciprocatably fitted into each cylinder 11a of the engine 1. A cavity forming a re-entrant combustion chamber 14a is formed in a top face of each piston 14. The piston 14 is coupled to a crankshaft 15 via a connecting rod 14b.

In the cylinder head 12, an intake port 16 and an exhaust port 17 are formed for each cylinder 11a, and an intake valve 21 for opening and closing an opening of the intake port 16 from the combustion chamber 14a side and an exhaust valve 22 for opening and closing an opening of the exhaust port 17 from the combustion chamber 14a side are disposed for each cylinder 11a. In each cylinder 11a, the intake port 16 includes two ports and the exhaust port 17 includes two ports, and therefore, the intake valve 21 includes two valves and the exhaust valve 22 includes two valves in each cylinder 11a.

Although it is not illustrated in FIG. 1, in a valve train system of the engine 1 for operating the intake and exhaust valves 21 and 22, for example, a hydraulically-actuated variable valve mechanism 71 (see FIG. 2, hereinafter, may be referred to as the VVL (Variable Valve Lift)) for switching an operation mode of the exhaust valve 22 between a normal mode and a special mode is provided on an exhaust side. The VVL 71 (the detailed configuration is not illustrated) includes two kinds of cams with different cam profiles in which a first cam has one cam nose and a second cam has two cam noses; and a lost motion mechanism for selectively transmitting an operating state of either one of the first and second cams to the exhaust valve. While the lost motion mechanism transmits the operating state of the first cam to the exhaust valve 22, the exhaust valve 22 operates in the normal mode where it opens only once during exhaust stroke. On the other hand, while the lost motion mechanism transmits the operating state of the second cam to the exhaust valve 22, the exhaust valve 22 operates in the special mode, which is a so-called exhaust open-twice control, where it opens once during the exhaust stroke and once more during intake stroke. The normal and special modes of the VVL 71 are switched therebetween according to an operating state of the engine. Specifically, the special mode is utilized for a control related to an internal exhaust gas recirculation (EGR). Note that in enabling the switch between the normal mode and the special mode, an electromagnetically-actuated valve train system which uses an electromagnetic actuator to operate the exhaust valve 22 may be adopted. Moreover, the internal EGR is not only achievable by the exhaust open-twice control. For example, the internal EGR control may be performed by an intake open-twice control where the intake valve 21 is opened twice, or by providing a negative overlap period in which both the intake and exhaust valves 21 and 22 are closed on either one of the exhaust stroke and the intake stroke to keep burned gas remaining within the cylinder 18.

Moreover, the cylinder head 12 is provided with injectors 18 for injecting the fuel and glowplugs 19 for increasing ignitability of the fuel by warming up intake air while the engine 1 is cold. Each injector 18 is arranged such that its fuel injection port is oriented toward an inside of the combustion chamber 14a from a ceiling face of the combustion chamber 14a, so that the injector 18 directly injects the fuel into the combustion chamber 14a near a compression stroke top dead center (CTDC).

Each glowplug 19 has a ceramic heater. The glowplug 19 is arranged such that its tip end part is oriented toward the inside of the combustion chamber 14a. As illustrated in FIG. 2, the glowplug 19 is connected to a voltage regulator 20. The voltage regulator 20 can adjust an output voltage.

An intake passage 30 is connected to one side face of the engine 1 to communicate with the intake ports 16 of the respective cylinders 11a. On the other hand, an exhaust passage 40 for discharging burned gas (i.e., exhaust gas) from the combustion chambers 14a of the respective cylinders 11a is connected to the other side face of the engine 1. Although they are described in detail later, a large turbocharger 61 and a small turbocharger 62 for turbocharging intake air are disposed in the intake and exhaust passages 30 and 40.

An air cleaner 31 for filtering the intake air is disposed in an upstream end part of the intake passage 30. On the other hand, a surge tank 33 is disposed near a downstream end of the intake passage 30. A part of the intake passage 30 downstream of the surge tank 33 is formed to be independent passages extending to the respective cylinders 11a so that a downstream end of each independent passage is connected to the intake port 16 of each cylinder 11a.

A compressor 61a of the large turbocharger 61, a compressor 62a of the small turbocharger 62, an intercooler 35 for cooling air compressed by the compressors 61a and 62a, and a throttle valve 36 for adjusting an amount of intake air for the combustion chambers 14a of the respective cylinders 11a are disposed in a part of the intake passage 30, between the air cleaner 31 and the surge tank 33. The throttle valve 36 is basically fully opened, and when the engine 1 is stopped, it is fully closed to avoid shock.

An upstream part of the exhaust passage 40 is comprised of an exhaust manifold having independent passages extending to the respective cylinders 11a and connected to respective external ends of the exhaust ports 17, and a merging part where the independent passages merge.

In a part of the exhaust passage 40 downstream of the exhaust manifold, a turbine 62b of the small turbocharger 62, a turbine 61b of the large turbocharger 61, an exhaust emission control system 41 for purifying hazardous components within the exhaust gas, an exhaust shutter valve 43 for throttling the exhaust passage 40, and a silencer 42 are disposed in this order from the upstream side.

The exhaust emission control system 41 includes an oxidative catalyst 41a and a diesel particulate filter (DPF) 41b disposed in this order from the upstream side. The oxidative catalyst 41a and the DPF 41b are contained in a single case. The oxidative catalyst 41a has an oxidative catalyst carrying, for example, platinum or a mixture of platinum with palladium, and stimulates reactions of CO and hydrocarbon (HC) within the exhaust gas being oxidized and becoming $CO_2$ and $H_2O$. The oxidative catalyst 41a configures a catalyst having an oxidative function. Moreover, the DPF 41b captures particulate matter (PM, e.g., soot) within the exhaust gas from the engine 1, and for example, the oxidative catalyst 41a is a wall-flow filter made of heat-resistant ceramic material (e.g., silicon carbide (SiC) or cordierite) or a three-dimensional mesh filter made of heat-resistant ceramic fiber. Note that the DPF 41b may be coated with the oxidative catalyst.

An exhaust gas recirculation passage 51 for recirculating a part of the exhaust gas to the intake passage 30 connects a part of the intake passage 30 between the surge tank 33 and the throttle valve 36 (i.e., a part downstream of the small compressor 62a of the small turbocharger 62) to a part of the exhaust passage 40 between the exhaust manifold and the small turbine 62b of the small turbocharger 62 (i.e., a part upstream of the small turbine 62b of the small turbocharger 62). An exhaust gas recirculation valve 51a for adjusting an amount of the exhaust gas to be recirculated to the intake passage 30, and an EGR cooler 52 for cooling the exhaust gas by using an engine coolant are disposed in the exhaust gas recirculation passage 51.

The large turbocharger 61 has the large compressor 61a disposed in the intake passage 30 and the large turbine 61b disposed in the exhaust passage 40. The large compressor 61a is disposed between the air cleaner 31 and the intercooler 35. On the other hand, the large turbine 61b is disposed between the exhaust manifold and the oxidative catalyst 41a.

The small turbocharger 62 has the small compressor 62a disposed in the intake passage 30 and the small turbine 62b disposed in the exhaust passage 40. The small compressor 62a is disposed downstream of the large compressor 61a. On the other hand, the small turbine 62b is disposed upstream of the large turbine 61b.

Specifically, in the intake passage 30, the large compressor 61a and the small compressor 62a are arranged in a line in this order from the upstream side, and in the exhaust passage 40, the small turbine 62b and the large turbine 61b are arranged in a line in this order from the upstream side. These large and small turbines 61b and 62b are rotated by an exhaust gas flow, and the large and small compressors 61a and 62a respectively coupled to the large and small turbines 61b and 62b are operated by the rotation of the large and small turbines 61b and 62b.

The small turbocharger 62 is relatively small, and the large turbocharger 61 is relatively large. In other words, the large turbine 61b of the large turbocharger 61 has a larger inertia than the small turbine 62b of the small turbocharger 62.

Further, the intake passage 30 is connected to a small intake bypass passage 63 bypassing the small compressor 62a. The small intake bypass passage 63 is disposed therein with a small intake bypass valve 63a for adjusting an amount of air flowing into the small intake bypass passage 63. The small intake bypass valve 63a is fully closed when power is not distributed (normally closed).

On the other hand, the exhaust passage 40 includes a small exhaust bypass passage 64 bypassing the small turbine 62b, and a large exhaust bypass passage 65 bypassing the large turbine 61b. A regulator valve 64a for adjusting an amount of the exhaust gas flowing into the small exhaust bypass passage 64 is disposed in the small exhaust bypass passage 64, and a wastegate valve 65a for adjusting an amount of the exhaust gas flowing into the large exhaust bypass passage 65 is disposed in the large exhaust bypass passage 65. Both of the regulator valve 64a and the wastegate valve 65a are fully open when power is not distributed (normally open).

An opening of the exhaust shutter valve 43 is controlled by an engine control unit (ECU) 10. The exhaust shutter valve 43 is normally open. For example, in a specific operating state of the engine 1 where an engine load is low and an engine speed is low (including an engine start), there is a case where the exhaust shutter valve 43 is closed. By closing the exhaust shutter valve 43, a back pressure of the engine 1 is increased and an amount of the burned gas remaining in the cylinder can be increased.

The diesel engine 1 having the above configuration is controlled by the ECU 10. The ECU 10 is comprised of a CPU, a memory 10a, a counter timer group, an interface, and a microprocessor having paths for connecting these units. As illustrated in FIG. 2, detection signals of sensors SW1 to SW7 are inputted to the ECU 10. The sensors include: a fluid temperature sensor SW1 for detecting a temperature of the engine coolant (hereinafter, referred to as the "fluid temperature"); a turbocharging pressure sensor SW2 attached to the surge tank 33 and for detecting a pressure of air supplied to the combustion chamber 14a (hereinafter, referred to as the "intake air pressure"); an intake air temperature sensor SW3 for detecting the temperature of intake air (hereinafter, referred to as the "intake air temperature"); a crank angle sensor SW4 for detecting a rotational angle of the crankshaft 15; an accelerator position sensor SW5 for detecting an accelerator opening corresponding to an angle of an acceleration pedal (not illustrated) of the vehicle; an upstream exhaust pressure sensor SW6 for detecting a pressure of the exhaust gas on the upstream side of the DPF 41b; and a downstream exhaust pressure sensor SW7 for detecting a pressure of the exhaust gas on the downstream side of the DPF 41b. By performing various kinds of operations based on these detection signals, the ECU 10 determines the state of the engine 1 and further the vehicle, and outputs control signals to the injectors 18, the voltage regulators 20, the VVL 71, the actuators of the various kinds of valves 36, 43, 51a, 63a, 64a, and 65a, and an alarm lamp 80 according to the determined state. The ECU 10 is one example of a glowplug control device.

Here, the ECU 10 operates the glowplugs 19 according to the operating state of the engine. The ECU 10 controls the applied voltage for each glowplug 19 and estimates a remaining life of the glowplug 19 so that the temperature of the glowplug 19 reaches a predetermined target temperature. The ECU 10 includes a target calculating module 101 for calculating a target applied voltage for the glowplug 19 so as to adjust the temperature of the glowplug 19 to the target temperature, an output module 102 for outputting the applied voltage to the glowplug 19, a temperature estimating module 103 for estimating the temperature of the glowplug 19, and a remaining life estimating module 104 for estimating the remaining life of the glowplug 19.

Figure 3:
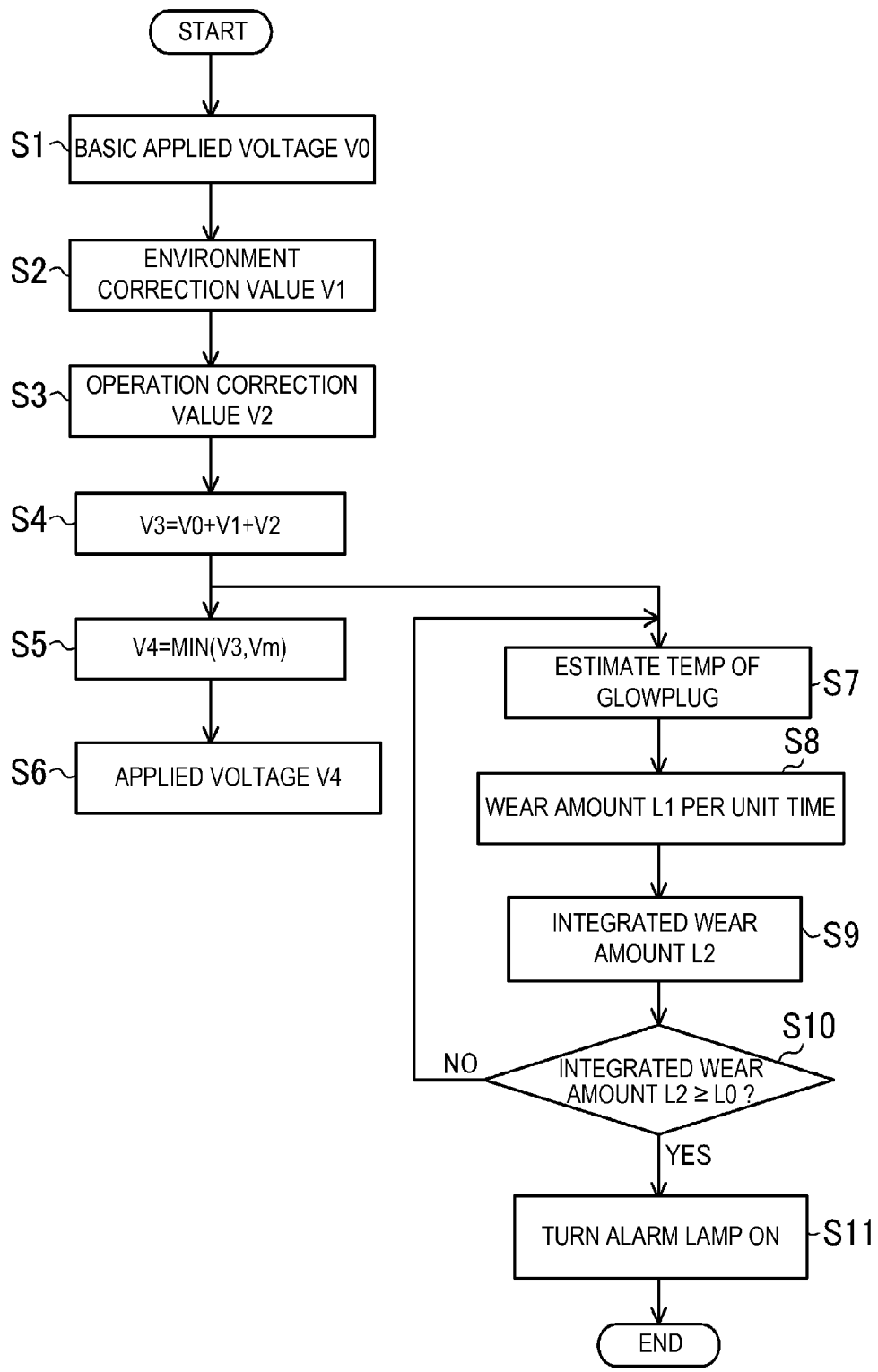
FIG. 3 is a flowchart illustrating a control of a glowplug.

Hereinafter, the content of the control is described in detail. FIG. 3 is a flowchart illustrating the control of the glowplug.

First, the ECU 10 reads an engine speed, a fuel injection amount, the fluid temperature, the intake air temperature, an atmospheric pressure, and the intake air pressure. Further, the target calculating module 101 of the ECU 10 calculates a basic applied voltage V0 based on a basic applied voltage map stored in the memory 10a (S1).

Specifically, the memory 10a stores a basic applied voltage map M1 where the basic applied voltage V0 for the glowplug 19 is determined. The basic applied voltage V0 is used to adjust the temperature of the glowplug 19 to the predetermined target temperature (e.g., 1200° C.) in a predetermined reference operating state of the engine.

The reference operating state may be set arbitrarily. In this embodiment, a state where the fuel is split and injected in six stages, an external EGR is stopped, the internal EGR is stopped, and the exhaust shutter valve 43 is fully opened is set as the reference operating state.

Figure 4:
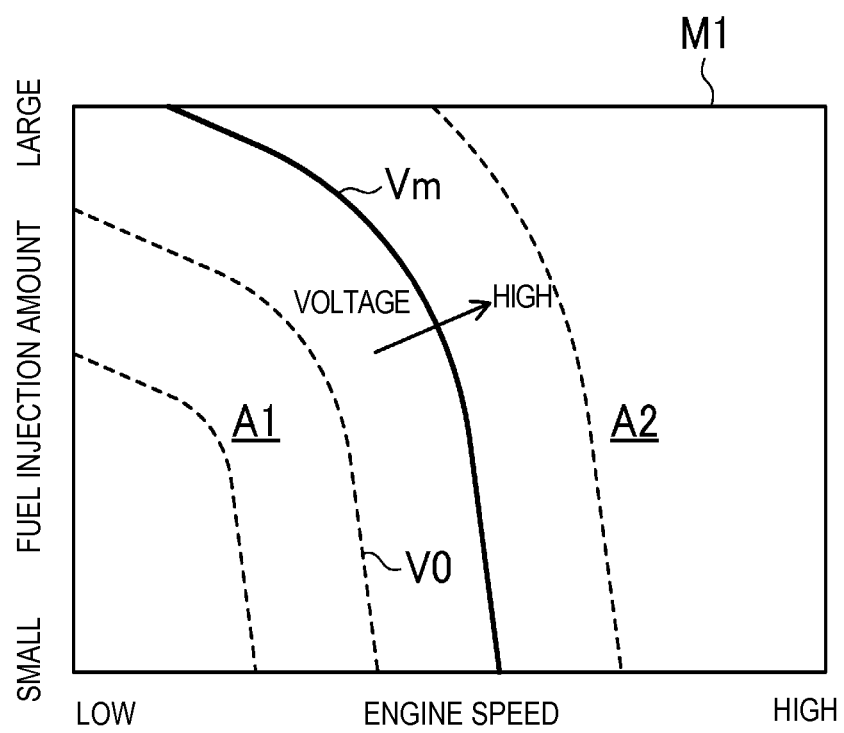
FIG. 4 is a basic applied voltage map in which a basic applied voltage is determined corresponding to an engine speed and a fuel injection amount.

In the basic applied voltage map M1, as illustrated in FIG. 4, the basic applied voltage V0 is determined based on the engine speed and the fuel injection amount. The basic applied voltage map M1 includes an area A1 where the basic applied voltage V0 is lower than a maximum applicable voltage Vm for the glowplug 19 (e.g., 11V), and an area A2 where the basic applied voltage V0 is higher than the maximum applicable voltage Vm. The maximum applicable voltage Vm is a highest possible voltage that can be applied to the glowplug 19. In the basic applied voltage map M1, the area A1 is created based on actual measurement values, and the area A2 is created based on values obtained from calculation using the actual measurement values. Specifically, the applied voltage at which the temperature of the glowplug 19 becomes the target temperature in the reference operating state is measured in advance with respect to each of the engine speed and the fuel injection amount. The actual measurement values are stored in the area A1. On the other hand, for a case where the temperature of the glowplug 19 does not reach the target temperature even after the maximum applicable voltage Vm is applied to the glowplug 19 in the reference operating state, the temperature of the glowplug 19 when the maximum applicable voltage Vm is applied to the glowplug 19 is measured in advance with respect to each of the engine speed and the fuel injection amount, an excess voltage exceeding the maximum applicable voltage Vm is calculated based on a difference between each actual measurement value and the target temperature, and a voltage obtained by adding the excess voltage to the maximum applicable voltage Vm is stored in the area A2 as the basic applied voltage V0.

The target calculating module 101 calculates the basic applied voltage V0 by comparing the actual engine speed and the actual fuel injection amount with the basic applied voltage map M1 prepared as above.

Next, at S2, the target calculating module 101 calculates an environment correction value V1 according to the environment conditions (e.g., the fluid temperature, the intake air temperature, the atmospheric pressure, and the intake air pressure).

For example, the memory 10a also stores a first base value map M2, a second base value map M3, a third base value map M4, a temperature correction coefficient map M5, an atmospheric pressure correction coefficient map M6, and an intake air pressure correction coefficient map M7. In each of the first to third base value maps M2 to M4, first to third base values X1 to X3 are determined according to the engine speed and the fuel injection amount. In the temperature correction coefficient map M5, a temperature correction coefficient a is determined according to the intake air temperature and the fluid temperature. In the atmospheric pressure correction coefficient map M6, an atmospheric pressure correction coefficient b is determined according to the atmospheric pressure. In the intake air pressure correction coefficient map M7, an intake air pressure correction coefficient c is determined according to the intake air pressure.

The target calculating module 101 calculates the first to third base values X1 to X3 by comparing the actual engine speed and the actual fuel injection amount with the first to third base value maps M2 to M4, calculates the temperature correction coefficient a by comparing the actual intake air temperature and the actual fluid temperature with the temperature correction coefficient map M5, calculates the atmospheric pressure correction coefficient b by comparing the actual atmospheric pressure with the atmospheric pressure correction coefficient map M6, and calculates the intake air pressure correction coefficient c by comparing the actual intake air pressure with the intake air pressure correction coefficient map M7. Further, the target calculating module 101 calculates the environment correction value V1 based on Equation 1 below.

$$V1 = a \times X1 + b \times X2 + c \times X3 \quad (1)$$

Note that the calculation method of the environment correction value described above is merely an example, and it may be obtained by other calculation method. For example, the number of kinds of the base value map is not limited to three, and may be one, two, four, or more. A single base value map may be applied to two or more of the correction coefficients. Moreover, the number of kinds of the correction coefficient maps is also not limited to three. The correction coefficient may be set suitably according to the kind of the environment condition to be used for the correction. Moreover, a single correction coefficient may be determined based on two or more environment conditions similarly to the temperature correction coefficient a, and alternatively, a single correction coefficient may be determined based on a single environment condition similarly to the atmospheric pressure correction coefficient b.

Next, at S3, the target calculating module 101 calculates an operation correction value V2 according to the operating state of the engine. Specifically, the target calculating module 101 calculates the operation correction value V2 based on a difference between the actual engine operating state and the reference operating state.

Specifically, the target calculating module 101 calculates a first operation correction value Y1 based on the number of fuel injection stages, a second operation correction value Y2 based on whether the external EGR is performed, a third operation correction value Y3 based on whether the internal EGR is performed, and a fourth operation correction value Y4 based on the opening of the exhaust shutter valve 43. Further, the target calculating module 101 calculates the operation correction value V2 based on Equation 2 below.

$$V2 = Y1 + Y2 + Y3 + Y4 \quad (2)$$

The first operation correction value Y1 is set to zero if the actual number of fuel injection stages is six, which is the same as in the reference operating state, and it is set larger as the actual number of fuel injection stages becomes less. In other words, the fuel injection amount for a single injection becomes larger as the number of fuel injection stages becomes less. If the fuel injection amount for a single injection is large, the temperature of the glowplug 19 reduces more. Therefore, the first operation correction value Y1 is set larger as the actual number of fuel injection stages becomes less.

Figure 5:
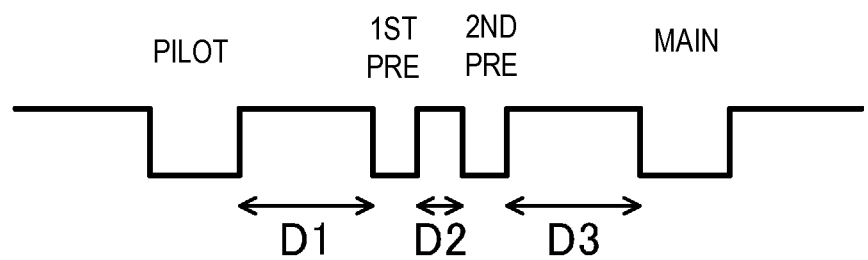
FIG. 5 is an example of a fuel injection pattern.

Here, in counting the actual number of fuel injection stages, if an interval between one injection and a subsequent injection is shorter than a predetermined interval, the target calculating module 101 considers the two injections as a single-stage injection. For example, in the injection pattern illustrated in FIG. 5, four injections including a pilot injection, a first pre-injection, a second pre-injection, and a main injection are performed. Therefore, the number of the fuel injection stages is normally counted up to four. However, the target calculating module 101 determines whether each injection interval is shorter than a predetermined interval d0 and takes the determination result into consideration in the counting. In the example of FIG. 5, each of injection intervals D1 and D3 is longer than the predetermined interval d0, and an injection interval D2 is shorter than the predetermined interval d0. Thus, the target calculating module 101 counts each of the pilot and main injections as a single-stage injection, but counts the first and second pre-injections together as a single-stage injection. If the injection interval is short, the temperature of the glowplug 19 decreases as much as the case where the amount of fuel for two injections is injected in a single injection. Therefore, in setting the first operation correction value Y1, the first and second pre-injections are considered as a single-stage injection. As a result, the target calculating module 101 counts the injection pattern in FIG. 5 as three-stage injections. In other words, the first operation correction value Y1 is set to be larger than that for the case where the number of the injection stages is counted normally.

The second operation correction value Y2 is set to a predetermined value when the external EGR is performed, and to zero when the external EGR is not performed. In other words, since the combustion temperature decreases when the external EGR is performed, the applied voltage for adjusting the temperature of the glowplug 19 to the target temperature needs to be increased. The target calculating module 101 determines whether the external EGR is performed, based on an opening of the exhaust gas recirculation valve 51a. Specifically, the target calculating module 101 determines that the external EGR is performed when the opening of the exhaust gas recirculation valve 51a is larger than a predetermined opening, whereas it determines that the external EGR is not performed when the opening of the exhaust gas recirculation valve 51a is smaller than the predetermined opening. For example, the predetermined opening is an opening with which the burned gas would be considered as not substantially flowing in the exhaust gas recirculation passage 51.

The third operation correction value Y3 is set to a predetermined value when the internal EGR is performed, and to zero when the internal EGR is not performed. In other words, since the internal EGR causes the decrease of the combustion temperature similarly to the external EGR, when the internal EGR is performed, the applied voltage for adjusting the temperature of the glowplug 19 to the target temperature needs to be increased. The target calculating module 101 determines whether the internal EGR is performed, based on the operation mode of the VVL 71. Specifically, the target calculating module 101 determines that the internal EGR is performed when the operation mode of the VVL 71 is the special mode, whereas it determines that the internal EGR is not performed when the operation mode of the VVL 71 is the normal mode.

The fourth operation correction value Y4 is set to a predetermined value when the opening of the exhaust shutter valve 43 is smaller than a predetermined opening, and to zero when the opening of the exhaust shutter valve 43 is larger than a predetermined opening. In other words, since the amount of burned gas remaining within the cylinder increases when the opening of the exhaust shutter valve 43 is reduced, the combustion temperature decreases. Therefore, when the opening of the exhaust shutter valve 43 is small, the applied voltage for adjusting the temperature of the glowplug 19 to the target temperature needs to be increased. For example, the predetermined opening is an opening with which the exhaust passage 40 would be considered to be not substantially throttled.

Thus, the target calculating module 101 calculates the operation correction value V2.

Next, the target calculating module 101 calculates a target applied voltage V3 based on Equation 3 below (S4).

$$V3 = V0 + V1 + V2 \quad (3)$$

At S5, the output module 102 of the ECU 10 compares the target applied voltage V3 calculated as described above, with the maximum applicable voltage Vm. Further, when the target applied voltage V3 is lower than the maximum applicable voltage Vm, the output module 102 sets an applied voltage V4 equal to the target applied voltage V3, and when the target applied voltage V3 exceeds the maximum applicable voltage Vm, the output module 102 sets the applied voltage V4 equal to the maximum applicable voltage Vm.

At S6, the output module 102 applies the applied voltage V4 to the glowplug 19 via the voltage regulator 20. Specifically, the output module 102 outputs a control signal corresponding to the applied voltage V4 to the voltage regulator 20, and the voltage regulator 20, upon receiving the control signal, applies the applied voltage V4 to the glowplug 19. Thus, the temperature of the glowplug 19 is adjusted according to the applied voltage V4.

Moreover, at S7, the temperature estimating module 103 of the ECU 10 estimates the temperature of the glowplug 19. Specifically, when the target applied voltage V3 is lower than the maximum applicable voltage Vm, the temperature estimating module 103 estimates that the temperature T of the glowplug 19 is at the target temperature (1200° C.), whereas when the target applied voltage V3 exceeds the maximum applicable voltage Vm, the temperature estimating module 103 estimates the temperature T of the glowplug 19 based on Equation 4 below.

$$T = \text{Target Temperature} - (V3 - Vm) \times K \quad (4)$$

Here, K [° C./V] is a sensitivity coefficient. Within the area where the glowplug 19 is used, since the sensitivity coefficient only slightly varies, the sensitivity coefficient K is treated as fixed, i.e., a constant. In other words, the temperature of the glowplug 19 is considered to change linearly with respect to the applied voltage.

Note that the basic applied voltage V0 in the area A2 of the basic applied voltage map M1 is also calculated by using the sensitivity coefficient K. In other words, a difference between the target temperature and the temperature of the glowplug 19 when the maximum applicable voltage Vm is applied to the glowplug 19 is divided by the sensitivity coefficient K to calculate the excess voltage exceeding the maximum applicable voltage Vm.

Figure 6:
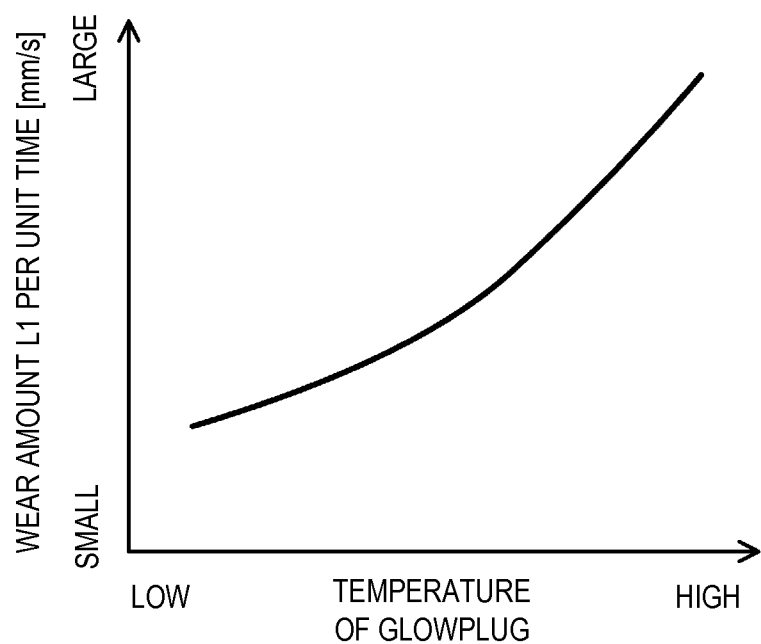
FIG. 6 is a chart illustrating a relationship between a temperature of the glowplug and a wear amount of the glowplug per unit time.

Subsequently, at S8, the remaining life estimating module 104 calculates a wear amount L1 of the glowplug 19 per unit time, based on the estimated temperature of the glowplug 19. Specifically, the memory 10a stores a wear amount table where the wear amount L1 of the glowplug 19 per unit time with respect to the temperature of the glowplug 19 is determined. The wear amount L1 per unit time is expressed, for example, by a reduction amount of a diameter of the glowplug 19 per second. For example, the relationship between the temperature of the glowplug 19 and the wear amount L1 of the glowplug 19 per unit time is as illustrated in the chart of FIG. 6. The remaining life estimating module 104 obtains the wear amount L1 of the glowplug 19 per unit time by comparing the estimated temperature of the glowplug 19 with the wear amount table.

At S9, the remaining life estimating module 104 calculates an integrated wear amount L2 by integrating the wear amounts L1 of the glowplug 19 per unit time. With the key turned off, the integrated wear amount L2 is stored in the memory 10a, and with the key turned on, the integrated wear amount L2 is read from the memory 10a and the wear amount is continuously integrated.

Subsequently, at S10, the remaining life estimating module 104 determines whether the integrated wear amount L2 is larger than a predetermined determination threshold L0. If the integrated wear amount L2 is larger than the determination threshold L0, the remaining life estimating module 104 determines that the end of life of the glowplug 19 has come, and at S11, the remaining life estimating module 104 turns the alarm lamp 80 on to inform a person on board. On the other hand, if the integrated wear amount L2 is lower than the determination threshold L0, the ECU 10 returns back to S7 to repeat the processing from the estimation of the temperature of the glowplug 19.

Note that the integrated wear amount L2 is reset when exchanging the glowplug 19. Moreover, in the case of exchanging the ECU 10, the integrated wear amount L2 stored in the memory 10a is transferred to the memory 10a of the new ECU 10.

Therefore, the glowplug control device of this embodiment includes the target calculating module 101 for calculating the target applied voltage for the glowplug 19 so as to adjust the temperature of the glowplug 19 to a predetermined target temperature. The glowplug control device of this embodiment also includes the output module 102 for applying the target applied voltage to the glowplug 19 when the target applied voltage is lower than the maximum applicable voltage, and applying the maximum applicable voltage to the glowplug 19 when the target applied voltage is higher than the maximum applicable voltage, the maximum applicable voltage being an upper limit for applying a voltage to the glowplug 19. The glowplug control device of this embodiment also includes the temperature estimating module 103 for estimating that the temperature of the glowplug 19 is at the target temperature when the target applied voltage is applied to the glowplug 19, and estimating that the temperature of the glowplug 19 is lower than the target temperature by the temperature decrease amount based on the difference between the target applied voltage and the maximum applicable voltage when the maximum applicable voltage is applied to the glowplug 19.

In other words, the method of estimating the temperature of the glowplug includes calculating the target applied voltage for the glowplug 19 so as to adjust the temperature of the glowplug 19 to a predetermined target temperature. The method also includes applying the target applied voltage to the glowplug 19 when the target applied voltage is lower than the maximum applicable voltage, and applying the maximum applicable voltage to the glowplug 19 when the target applied voltage is higher than the maximum applicable voltage, the applicable voltage being an upper limit for applying a voltage to the glowplug 19. The method also includes estimating that the temperature of the glowplug 19 is at the target temperature when the target applied voltage is applied to the glowplug 19, and estimating that the temperature of the glowplug 19 is at the temperature lower than the target temperature by the temperature decrease amount based on the difference between the target applied voltage and the maximum applicable voltage when the maximum applicable voltage is applied to the glowplug 19.

According to the above configuration, the target applied voltage for adjusting the temperature of the glowplug 19 to the target temperature is calculated. When the target applied voltage is lower than the maximum applicable voltage, the target applied voltage is applied to the glowplug 19, and when the target applied voltage is higher than the maximum applicable voltage, the maximum applicable voltage is applied to the glowplug 19. Further, the temperature of the glowplug 19 is estimated to be at the target temperature when the target applied voltage is applied to the glowplug 19, and the temperature of the glowplug 19 is estimated to be at the temperature lower than the target temperature by the temperature decrease amount based on the difference between the target applied voltage and the maximum applicable voltage when the maximum applicable voltage is applied to the glowplug 19. Thus, the temperature of the glowplug 19 can be obtained accurately.

Moreover, the glowplug control device of this embodiment also includes the memory 10a for storing the basic applied voltage for the glowplug 19 so as to adjust the temperature of the glowplug 19 to the predetermined target temperature in the predetermined reference operating state of the engine, and the target calculating module 101 calculates the target applied voltage by correcting the basic applied voltage according to the difference between the actual engine operating state and the reference operating state.

According to the above configuration, the basic applied voltage V0 is stored in the memory 10a, as the basic applied voltage map M1. Further, the target calculating module 101 calculates the operation correction value V2 according to the difference between the actual engine operating state and the reference operating state which is a precondition of the basic applied voltage V0, and corrects the basic applied voltage V0 with the operation correction value V2. Thus, it is not necessary to store, for various operating states, applied voltages for adjusting the temperature of the glowplug 19 to the target temperature, and the amount of data stored in the memory 10a can be reduced.

Moreover, in the reference operating state, the fuel is set to be split and injected in a predetermined number of injection stages. The target calculating module 101 corrects the basic applied voltage so that the target applied voltage becomes higher as the actual number of fuel injection stages becomes less than the predetermined number of injection stages. When the interval between one injection and a subsequent injection is shorter than the predetermined interval d0, the target calculating module 101 corrects the basic applied voltage while considering the two injections as a single-stage injection.

According to the above configuration, instead of correcting the basic applied voltage simply based on the number of injection stages, the basic applied voltage can be corrected by taking the temperature decrease amount of the glowplug 19 according to the injection interval into consideration. In other words, the basic applied voltage can be corrected based on the actual temperature decrease amount of the glowplug 19.

Further, the glowplug control device of this embodiment also includes the remaining life estimating module 104 for calculating the wear amount of the glowplug 19 based on the estimated temperature of the glowplug 19 and the operation time period of the glowplug 19, and estimating the remaining life of the glowplug 19 by integrating the wear amounts, the estimated temperature obtained by the temperature estimating module 103.

According to the above configuration, the wear amount of the glowplug 19 is calculated based on the estimated temperature of the glowplug 19 and the operation time period, and the remaining life of the glowplug 19 is estimated based on the wear amount. Therefore, by accurately estimating the temperature of the glowplug 19, the remaining life of the glowplug 19 can be estimated accurately.

Other Embodiments

The description of the above embodiment was given as an illustration of the art of the present invention. However, the art of the present invention is not limited to the above embodiment, and may be applied to other embodiments with suitable modification, replacement, addition, and/or omission. Moreover, any of the components described in the above embodiment may be combined to form another embodiment. Moreover, for the illustration of the art described above, the components in the appended drawings and the detailed description may include components that are not essential in solving the problems described above. Therefore, the non-essential components should not be found essential only because they are in the appended drawings and the detailed description.

The above embodiment may have the following configurations.

For example, in the above embodiment, the applied voltage is controlled; however, alternatively, an applied power may be controlled. Specifically, it may be such that a target applied power is obtained and compared with a maximum applicable power, then one of the target applied power and the maximum applicable power is applied to the glowplug 19 based on the comparison result, and the temperature of the glowplug 19 is estimated based on either one of the target applied power and a difference between the target applied power and the maximum applicable power.

The method of obtaining the target applied voltage described above is merely an example, and other method may be used. For example, instead of using a map, a formula may be used to obtain the target applied voltage.

Moreover, the reference operating state of the engine which is a precondition of the basic applied voltage described above is merely an example, and an operating state other than the state described above may be the reference operating state.

In the above embodiment, the sensitivity coefficient K is a constant; however, it may change according to the voltage (e.g., the target applied voltage V3).

In the above embodiment, the estimated temperature of the glowplug 19 is used for estimating the remaining life of the glowplug 19; however, it is not limited to this. The estimated temperature may be used for a control of the glowplug 19 other than for estimating the remaining life.

In the above embodiment, two injections with a short injection interval therebetween is considered as a single-stage injection to correct the basic applied voltage; however, it is not limited to this. For example, it may be such that when the injection amount in one of two consecutive injections is smaller than a predetermined amount, the two injections are considered as a single-stage injection and one of the basic applied voltage and the basic applied power is corrected. In other words, when the injection amount is small, the influence of the injection on the temperature decrease of the glowplug is small, and further, as the injection amount of the injection is smaller, the injection amount of the other injection increases; therefore, the injection in which the injection amount is small may be, instead, counted as plural-stage injections.

Alternatively, it may be such that the fuel is set to be split and injected in the predetermined number of injection stages in the reference operating state, the target calculating module 101 corrects one of the basic applied voltage and the basic applied power so that one of the target applied voltage and the target applied power increases as the actual number of fuel injection stages becomes less than the predetermined number of injection stages, and when the interval between one injection and a subsequent injection is shorter than the predetermined interval, the target calculating module 101 corrects one of the basic applied voltage and the basic applied power to a value between one of the target applied voltage and the target applied power when the two injections are considered as a single-stage injection and one of the target applied voltage and the target applied power when the two injections are considered as two-stage injections.

In other words, to describe the injection pattern in FIG. 5 as an example, since the injection intervals D1 and D3 are longer than the predetermined interval d0 and the injection interval D2 is shorter than the predetermined interval d0, the first operation correction value Y1 is set to a value between the value when the number of injection stages is four and the value when the number of injection stages is three. Thus, the temperature decrease of the glowplug can be estimated accurately.

As described above, the art disclosed herein is useful for the control device of the glowplug and the method of estimating the temperature of the glowplug.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTER

10 ECU (Control Device of Glowplug)
19 Glowplug
101 Target Calculating Module
102 Output Module
103 Temperature Estimating Module
104 Remaining Life Estimating Module
V0 Basic Applied Voltage
V3 Target Applied Voltage
Vm Maximum Applicable Voltage

What is claimed is:
1. A glowplug control device for controlling one of an applied voltage and an applied power for a glowplug, comprising:
a target calculating module for calculating one of a target applied voltage and a target applied power for the glowplug, so as to adjust a temperature of the glowplug to a predetermined target temperature;
an output module for applying the one of the target applied voltage and the target applied power to the glowplug when the one of the target applied voltage and the target applied power is lower than one of a maximum applicable voltage and a maximum applicable power, and applying the one of the maximum applicable voltage and the maximum applicable power to the glowplug when the one of the target applied voltage and the target applied power is higher than the one of the maximum applicable voltage and the maximum applicable power, the maximum applicable voltage being an upper limit for applying a voltage to the glowplug, the maximum applicable power being an upper limit for applying a power to the glowplug;

a temperature estimating module for estimating that the temperature of the glowplug is at the target temperature when the one of the target applied voltage and the target applied power is applied to the glowplug, and estimating that the temperature of the glowplug is lower than the target temperature by a temperature decrease amount that is based on either one of a difference between the target applied voltage and the maximum applicable voltage and a difference between the target applied power and the maximum applicable power when the one of the maximum applicable voltage and the maximum applicable power is applied to the glowplug; and a memory for storing one of a basic applied voltage and a basic applied power for the glowplug, so as to adjust the temperature of the glowplug to the predetermined target temperature in a predetermined reference operating state of an engine, wherein the target calculating module calculates the one of the target applied voltage and the target applied power by correcting the one of the basic applied voltage and the basic applied power according to a difference between an actual operating state of the engine and the reference operating state, wherein in the reference operating state, a fuel is set to be split and injected in a predetermined number of injection stages, wherein the target calculating module corrects the one of the basic applied voltage and the basic applied power so that the one of the target applied voltage and the target applied power becomes higher as an actual number of fuel injection stages becomes less than the predetermined number of injection stages, and wherein when an interval between one fuel injection and a subsequent fuel injection is shorter than a predetermined interval or when a fuel injection amount in one of two consecutive fuel injections is smaller than a predetermined amount, the target calculating module corrects the one of the basic applied voltage and the basic applied power while considering the two fuel injections as a single-stage injection.

2. A glowplug control device for controlling one of an applied voltage and an applied power for a glowplug, comprising:

a target calculating module for calculating one of a target applied voltage and a target applied power for the glowplug, so as to adjust a temperature of the glowplug to a predetermined target temperature;

an output module for applying the one of the target applied voltage and the target applied power to the glowplug when the one of the target applied voltage and the target applied power is lower than one of a maximum applicable voltage and a maximum applicable power, and applying the one of the maximum applicable voltage and the maximum applicable power to the glowplug when the one of the target applied voltage and the target applied power is higher than the one of the maximum applicable voltage and the maximum applicable power, the maximum applicable voltage being an upper limit for applying a voltage to the glowplug, the maximum applicable power being an upper limit for applying a power to the glowplug;

a temperature estimating module for estimating that the temperature of the glowplug is at the target temperature when the one of the target applied voltage and the target applied power is applied to the glowplug, and estimating that the temperature of the glowplug is lower than the target temperature by a temperature decrease amount that is based on either one of a difference between the target applied voltage and the maximum applicable voltage and a difference between the target applied power and the maximum applicable power when the one of the maximum applicable voltage and the maximum applicable power is applied to the glowplug; and a memory for storing one of a basic applied voltage and a basic applied power for the glowplug, so as to adjust the temperature of the glowplug to the predetermined target temperature in a predetermined reference operating state of an engine, wherein the target calculating module calculates the one of the target applied voltage and the target applied power by correcting the one of the basic applied voltage and the basic applied power according to a difference between an actual operating state of the engine and the reference operating state, wherein in the reference operating state, a fuel is set to be split and injected in a predetermined number of injection stages, wherein the target calculating module corrects the one of the basic applied voltage and the basic applied power so that the one of the target applied voltage and the target applied power becomes higher as an actual number of fuel injection stages becomes less than the predetermined number of injection stages, and wherein when an interval between one fuel injection and a subsequent fuel injection is shorter than a predetermined interval, the target calculating module corrects the one of the basic applied voltage and the basic applied power to a value between the one of the target applied voltage and the target applied power when the two fuel injections are considered as a single-stage injection and the one of the target applied voltage and the target applied power when the two fuel injections are considered as two-stage injections.

3. The glowplug control device of claim 1, further comprising a remaining life estimating module for calculating a wear amount of the glowplug based on the estimated temperature of the glowplug and an operating period of time of the glowplug, and estimating a remaining life of the glowplug by integrating the wear amounts.

4. The glowplug control device of claim 2, further comprising a remaining life estimating module for calculating a wear amount of the glowplug based on the estimated temperature of the glowplug and an operating period of time of the glowplug, and estimating a remaining life of the glowplug by integrating the wear amounts.

5. A method of estimating a temperature of a glowplug, comprising:

calculating one of a target applied voltage and a target applied power for the glowplug, so as to adjust the temperature of the glowplug to a predetermined target temperature;

applying the one of the target applied voltage and the target applied power to the glowplug when the one of the target applied voltage and the target applied power is lower than one of a maximum applicable voltage and a maximum applicable power, and applying the one of the maximum applicable voltage and the maximum applicable power to the glowplug when the one of the target applied voltage and the target applied power is higher than the one of the maximum applicable voltage and the maximum applicable power, the maximum applicable voltage being an upper limit for applying a voltage to the glowplug, the maximum applicable power being an upper limit for applying a power to the glowplug;

estimating that the temperature of the glowplug is at the target temperature when the one of the target applied voltage and the target applied power is applied to the glowplug, and estimating that the temperature of the glowplug is lower than the target temperature by a temperature decrease amount that is based on either one of a difference between the target applied voltage and the maximum applicable voltage and a difference between the target applied power and the maximum applicable power when the one of the maximum applicable voltage and the maximum applicable power is applied to the glowplug;

storing one of a basic applied voltage and a basic applied power for the glowplug, so as to adjust the temperature of the glowplug to the predetermined target temperature in a predetermined reference operating state of an engine;

calculating the one of the target applied voltage and the target applied power by correcting the one of the basic applied voltage and the basic applied power according to a difference between an actual operating state of the engine and the reference operating state, wherein in the reference operating state, a fuel is set to be split and injected in a predetermined number of injection stages;

correcting the one of the basic applied voltage and the basic applied power so that the one of the target applied voltage and the target applied power becomes higher as an actual number of fuel injection stages becomes less than the predetermined number of injection stages; and when an interval between one fuel injection and a subsequent fuel injection is shorter than a predetermined interval, correcting the one of the basic applied voltage and the basic applied power to a value between the one of the target applied voltage and the target applied power when the two fuel injections are considered as a single-stage injection and the one of the target applied voltage and the target applied power when the two fuel injections are considered as two-stage injections.

6. The method of claim 5, further comprising calculating a wear amount of the glowplug based on the estimated temperature of the glowplug and an operating period of time of the glowplug, and estimating a remaining life of the glowplug by integrating the wear amounts.

* * * * *